INVENTORS
Klaus Heinecke
Knut Heitmann
Werner H.K. Holle &
Eckart Schneider

INVENTORS
Klaus Heinecke
Knut Heitmann
Werner H.K. Holle &
Eckart Schneider

United States Patent Office 3,521,270
Patented July 21, 1970

3,521,270
METHOD AND APPARATUS FOR THE INTERPOLATION OF A PERIODIC SEQUENCE OF INFORMATION
Klaus Heinecke, Knut Heitmann, Werner H. K. Holle, and Eckart Schneider, Wetzlar, Germany, assignors to Ernst Leitz, G.m.b.H., Wetzlar (Lahn), Germany
Filed Apr. 4, 1966, Ser. No. 540,034
Claims priority, application Germany, Apr. 13, 1965, L 50,450; Jan. 28, 1966, L 52,699
Int. Cl. H03k *13/02*
U.S. Cl. 340—347          22 Claims

ABSTRACT OF THE DISCLOSURE

Method and apparatus for interpolating between the salient features of periodic signals which are periodic functions of displacement or other variables. Such signals may, for instance, be the signals produced by photoelectric position determining systems of the moire grating type which are used in conjunction with machine tool carriages and the like. The results of interpolation may be displayed in digital form, recorded by digital recording means, or both. The periodic signals are compared with phase displaced versions of themselves in balancing circuits the null output of which indicates that the periodic signals have reached corresponding predetermined phase positions.

BACKGROUND OF THE INVENTION

The present invention relates to methods and apparatuses for interpolating between the salient features of periodic signals which are periodic functions of displacement or other variables. Such signals may take the form of electrical voltages, and said apparatuses may be capable of presenting digital indications and/or making digital recordings.

While the present invention has numerous applications, as will be apparent to persons skilled in the arts to which it pertains, it is particularly applicable to the fields of optical position measurement and optical goniometry, and the ensuing description will be directed to the application of the present invention in the field of optical position measurement. The following description of the manner of application of the present invention in the field of optical position measurement will be adequate to enable persons skilled in the art to understand the manner of its use in other applications.

It is known in the optical measurement art, e.g., in optical position measuring and goniometry, that one may cause the light falling on a photocell or eyepiece to vary in intensity as a periodic function of the displacement of the carriage of a tool or instrument by means of gratings affixed to the carriage and body, respectively, of the tool or instrument. The corresponding variations in the amplitude of the voltage produced by the photocell constitute a periodic signal which is a periodic function of the displacement of the carriage. A count of the number of salient features of the periodic function, e.g., light intensity maxima and minima, occurring at the photocell or eyepiece is an indication of the total displacement of the carriage and body relative to each other. If it is desired to determine not only the extent of the displacement but also the direction of the displacement, two photoelectric transducers offset with respect to each other by an amount and in a direction approximately proportioned to one quarter of the displacement corresponding to a full period of said periodic function can be provided, whose output voltages will indicate the displacing direction by their mutual phase relation.

The minimum distance measuring capacity of these known systems is limited by the grating constant of the gratings employed. Attempts have therefore not been lacking to multiply the number of signal periods per unit distance of carriage movement.

The means employed for this purpose have included both optical and electrical expedients, but at best a total multiplication factor of 8 has been achieved.

SUMMARY OF THE INVENTION

The present invention is directed to the problem of providing arrangements which allow for considerably finer interpolation. In order to achieve this, certain other known expedients may be adopted. However, these expedients allow highly linear interpolation only when the number of interpolations within one period of the periodic signal is stringently limited.

The present invention is therefore directed to a method of interpolation between salient features of an input signal which is a periodic function of a variable (e.g., displacement), and which may take the form of one or more voltages. This method is characterized in that an even number of voltages is formed from the periodic input signal by phase displacement, two of these voltages being 180° out of phase with respect to each other. The quotient of two of said voltages which are not 180° out of phase with respect to each other is used to determine the instantaneous phase of the periodic input signal. Voltages which when displayed on a properly synchronized cathode ray oscilloscope have different shapes than that of the periodic input signal, but have the same period as that of the periodic input signal, and have a mutually constant amplitude ratio, may be employed for interpolating at any desired phase position of the periodic input signal. In the general case, at least one of these substitute voltages will change with each change in the periodic input signal. The quotient of either the periodic input signals and the phase displaced versions thereof, or the substitute voltages, is formed in a bridge or balancing network across the balancing points of which a phase position indicating output signal is taken. The parameters of said bridge or balancing network are so selected that there is no voltage across the balancing points, when the periodic input signal is in a corresponding predetermined phase state or position. When only a single periodic input signal voltage is used in carrying out the present invention, three auxiliary signals periodic input signal identical with respect to each other in period and constant with regard to amplitudes are produced. The first of these is displaced with respect to the periodic input signal by a value $$\leq n \cdot 180°$$

(*n* being an integer). The second of these auxiliary signals is displaced with respect to periodic input signal by about 180°, and the third of these signals is displaced with respect to the first auxiliary signal by about 180°. According to a further feature of the present invention, the output indicating signal is simultaneously used for controlling a counter. The balancing network for carrying out this method is characterized voltage dividers whose fixed terminals are connected between two of signal input terminals and whose mult signal are output terminals. In an advantageous embodiment of the device, one flipflop is connected to each of these movable contacts and the outputs of these flips-flops are intercoupled by way of AND gates in such a manner that only one interpolation value can be indicated at a time. According to a further embodiment of the present invention, means may be provided which make it possible to zero the indicating device connected to the balancing network independently of the instantaneous state of the periodic input signal. According to a further application of the inventive concept, the method described hereinabove may also be employed for the frequency multiplication, and the simplicity of the necessary switching means is particularly noteworthy in this connection.

An object of the present invention is the provision of a novel method and apparatus for the interpolation of a periodic input signal in the form of one or several electrical voltages.

Another object of the present invention is the provision of an improved method and apparatus for the interpolation of a periodic input signal in the form of an electrical voltage by forming an even number of voltages by phase displacement and employing these voltages for characterizing a specific phase position within the periodic input signal.

A further object of the present invention is to provide an improved method and apparatus for the interpolation of a periodic input signal in the form of an electrical voltage by forming an even number of voltages by phase displacement for characterizing a specific phase position within the signal where the voltages have the same period, the ratio of their amplitudes is constant, and at least one of these voltages changes as each change of angle in that input signal.

Other objects, advantages and capabilities of the present invention will become apparent from the following detailed description, taken in conjunction with the accompanying drawings, showing only preferred embodiments of the invention.

DESCRIPTION OF THE PREFERRED EMBODIMENTS

Figure 1:
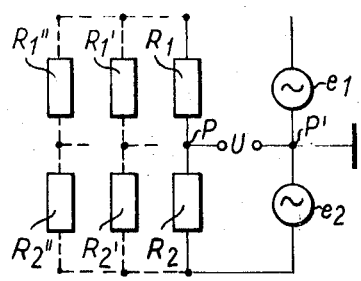
FIG. 1 is a block circuit diagram of an arrangement according to the invention, the electrical values of the units being coordinated to a specific phase position within a periodic input signal.

Let it be assumed initially that the periodic input signal is sinusoidal and that the first auxiliary signal displaced, for example, about 90° with respect to the former, is also present. The means to produce such phase shifted waveforms are described in Phase Shifters, ITT book "Reference Data for Radio Engineers," 1956 edition, page 469, or in U.S. Pat. No. 2,857,802. For each phase position within one period, there exists a specific elongation ratio, or in other words, each phase position can be identified by a corresponding specific quotient of the instantaneous values of the two voltages. As is known, the absolute value of one voltage may now be represented by one resistance magnitude. If the sources of the two signals $e_1$, $e_2$ are now connected with a voltage divider $R_1$, $R_2$ to form a bridge, as has been illustrated in FIG. 1, there will result between points P, P' of this connection a voltage U which is also sinusoidal, and the instantaneous value of this voltage depends upon the voltage divider ratio and upon the phase angle of the two voltages being fed in. If the ratio of the resistances is chosen to be equal to the signal voltages for a specific phase angle $\varphi_0$, the voltage U will pass through zero at the point $\varphi_0$. In other words, this phase angle may be determined by the choice of the resistance ratio of the voltage divider. If further voltage dividers $R_1'$, $R_2'$; $R_1''$, $R_2''$, etc., having varying resistance ratios with respect to each other are connected in parallel to the aforementioned voltage divider, further phase angle values may be determined thereby.

As is readily apparent, voltage U will exhibit a null or zero value not only for the phase angle $\varphi_0$, but also for the phase angle $\varphi_0+\pi$ when the balancing network is set to a particular resistance ratio $R_1/R_2$. In order to avoid any confusion in this regard, it is expedient to define as interpolation points those at which the voltage U passes through zero with the same, for example, a negative direction of pitch (rise). In that case, however, the two voltages $e_1$, $e_2$ furnish interpolation values only in one quadrant. In order to obtain interpolation values also in the other quadrants, one produces from the two voltages $e_1$, $e_2$ voltages $-e_1$, $-e_2$ traveling in push-pull relation with respect to the former and links the same with respect to each other and to the signal voltage as well as to the first auxiliary voltage in the manner described hereinabove.

The particular advantage of this method resides in that the signals to be processed need not be sinusoidal. Instead, they must merely meet the following conditions, which can be readily realized in practice, namely (a) they must have the same period duration, (b) the ratio of the amplitudes thereof must be constant, and (c) at least one of the voltages must change with each change in the input signal. When these conditions are met, even signals having a trapezoidal shape may still be interpolated according to the novel method. As long as the aforementioned requirements are satisfied, the signals $e_1$, $e_2$ may even display curved shapes or configurations which are substantially different from each other.

Figure 3:
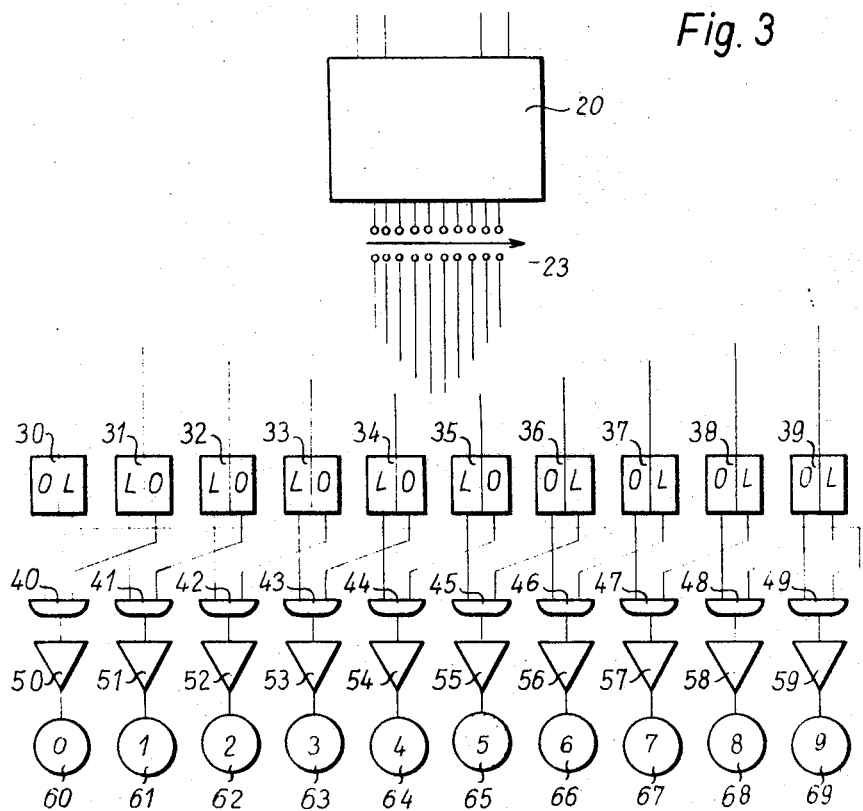
FIG. 3 is a block circuit diagram disclosing a digital indicator for the interpolation points in accordance with the present invention.
Figure 2:
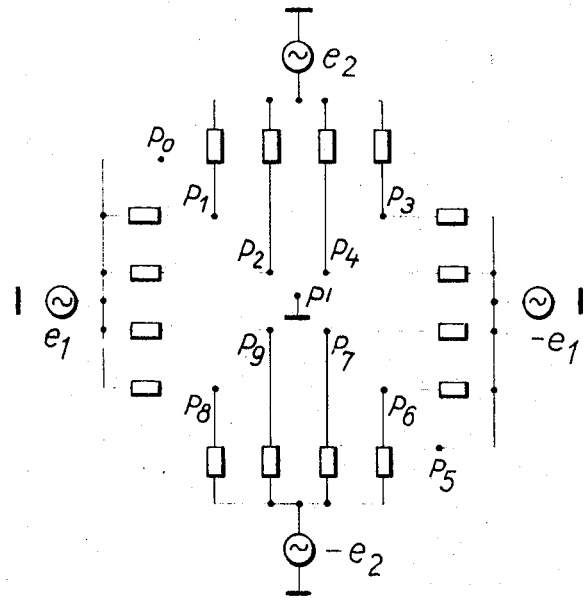
FIG. 2 is a modification of the arrangement in FIG. 1 for determining several specific phase positions within a periodic input signal.
Figure 4:
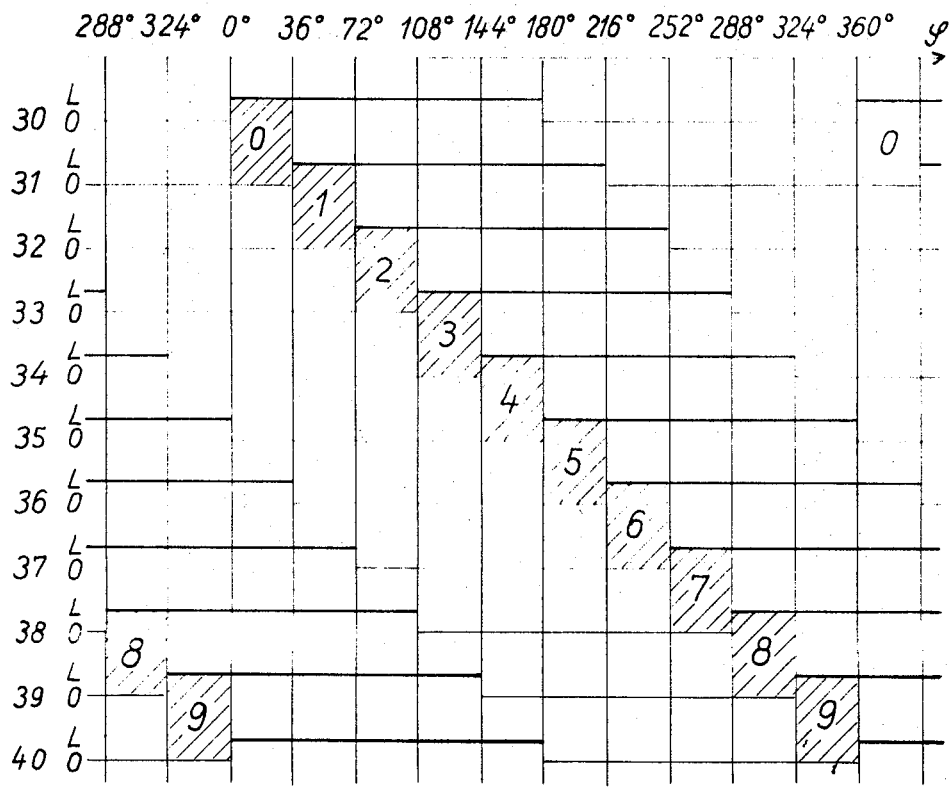
FIG. 4 shows a graphical representation of the overlapping switching states schematically disclosed in FIG. 3.

FIG. 2 shows as an example an elaborate device or arrangement with the aid of which a decimal interpolation may be carried out according to the method described above utilizing an even number of voltages $e_1$, $e_2$, $-e_1$ and $-e_2$, in which two of such voltages are in opposite phase with respect to each other. Since merely the resistance ratio of two resistances is of importance, potentiometers of less precision may also be employed in this case as voltage dividers. This has the advantage that the positions of the interpolation points may be adjusted or set exactly without requiring structural precision elements therefor. The indication of the interpolation points, i.e., the coordinated phase angle $\varphi$, is to be effected digitally; and, in order that this be achieved, one advantageously employs flip-flops 30–39 as voltage discriminators (FIG. 3) which, in turn, control indicating instruments 60–69. These flip-flops 30–39 are connected to the balancing points of the resistance network 20 and are so biased that they will switch during the passage through zero of the voltages U. As may be seen in FIG. 4, overlapping of the switching states by 36° will be brought about by properly biasing the flip-flops and selecting the switching phase position of each flip-flop in each signal period in dependence upon the phase angle $\varphi$. At any time half of the flip-flops carry the same output signal, say, logical zero, and the other half of the flip-flops carry the other possible output signal combination, viz, logical one. In order to produce an unambiguous indication, the trigger outputs are logically interlinked by means of AND-gates 40–49. The logical rules for the interconnection of this array may be stated as: The digit $n$ is indicated only and exclusively if the trigger $T_n$ is set and trigger $T_{n+1}$ is reset. This condition will arise only once within one period of the periodic input signal for each digit ... etc. In FIG. 3, the flip-flop array shown is interlinked in accordance with this condition. The outputs of the AND gates are connected with ten indicating lamps 60–69 by way of amplifier stages 50–59.

In operation, let it now be assumed that the flip-flop 35 has just been set. The flip-flops 30–34 are also in the set. The flip-flop 35, however, is distinguished from the latter in that its neighbor 36 is not set and therefore, accordingly, the digit 5 is thus indicated in accordance with the logical rules referred to hereinabove.

Reference numeral 23 is used to identify a switch by means of which the trigger inputs may be cyclically exchanged with respect to the network outputs. It is thus possible to set any desired point $\varphi_0$ in the indicator lamp band at zero.

If the coarse counting of the periods is intended to be possible both in the forward and also in the rearward direction (and this is necessary, for example, when reading a scale, since the latter is in fact adapted to move with respect to a reference point in two measuring directions which are opposite with respect to each other), the first auxiliary voltage is furnished in the same manner as the periodic input signal; for example, by photoelectrically scanning a point of the measuring graduation which is effectively offset by ¼ period with respect to the scanning point at which the periodic input signal is derived.

Devices of this type are described for example in U.S. Pat. 2,886,717 or U.S. Pat. 2,857,802.

It is advantageous to assure the synchronization of the counter, which records in full periods, and interpolator by controlling the counter in dependence upon one or several digit-to-digit transitions of the interpolator (for example, 0 to 9, and, in the other direction, 9 to 0 in decimal interpolation, or 15 to 16 and, in the other direction 16 to 15, 30 to 31 and, in the other direction, 31 to 30, 45 to 46 and, in the other direction, 46 to 45, 59 to 0 and, in the other direction, 0 to 59 in specific sixty-part interpolation).

The method described hereinabove which renders possible subdivision of the signal period into a desired number of interpolation points, even an odd number, may advantageously be employed also for frequency multiplication. For example, the output voltages of the AND gates shown in FIG. 3 may be combined on a single signal line, after differentiation, by way of known summing circuits. This line will then carry a sequence of pulses corresponding to the interpolation steps. In that case, the advantage of the method, namely that relatively simple means are needed for carrying it out, will be utilized.

If the resistance network is provided as in the form of plug units, a versatile device is obtained which involves little expenditure and which operates absolutely safely.

It remains to be noted that the use of potentiometers within the network also renders it possible—in addition to the advantage which has already been mentioned hereinabove—to convert the network rapidly to any desired signal-curve shape satisfying the aforementioned limiting conditions.

Instead of the resistance combinations mentioned above, inductive or capacitive means may also be utilized for the quotient formation.

While a preferred and practical embodiment of the invention has been disclosed in the above description, it will be understood by those skilled in the art that the specific application made reference to is by way of example and is not to be construed as limiting the scope of the invention.

What is claimed is:

1. The method of interpolating between the salient features of a data manifestation in the form of at least one signal voltage which represents a periodic function of an independent variable, said method comprising the steps of: producing at least two pairs of voltages of the same period as said at least one signal voltage, the voltages of a pair being of opposite phase and phase displaced with respect to the voltage of the other pair; comparing the amplitudes of two of said voltages which are not in phase opposition; and indicating the times at which the ratio of said amplitudes is equal to a ratio known to correspond to a particular phase state of said data.

2. The method claimed in claim 1 in which at least one of said auxiliary voltages represents a function which is different in phase from the function represented by said at least one signal voltage, said functions having the same period and a fixed ratio of peak amplitudes, at least one of said auxiliary voltages changing whenever said at least one signal voltage changes.

3. The method claimed in claim 1 in which there are three of said auxiliary voltages each of which represents the function represented by said at least one signal voltage, a first one of said auxiliary voltages being substantially in phase opposition to said at least one signal voltage, and second and third ones of said auxiliary voltages being substantially in phase opposition to each other but not in phase opposition to said at least one signal voltage.

4. The method claimed in claim 1 including the step of counting the number of times at which said ratio of amplitudes is equal to said known ratio in order to determine the total number of periods which said at least one signal voltage has passed through.

5. The method claimed in claim 4 in which said counting step is carried out algebraically and the algebraic sign of each of the counts corresponding to an equality between said ratio of amplitudes and said known ratio is determined from a signal voltage corresponding to a second data manifestation, which signal voltage is further utilized in place of one of said auxiliary voltages.

6. Apparatus for interpolating between the salient features of a data manifestation in the form of at least one signal voltage which represents a periodic function of an independent variable, comprising:
  phase displacing means for producing pairs of voltages which are of the same period as said signal voltage but are phase displaced with respect thereto, two of said voltages being of opposite phase;
  comparing means for comparing the amplitudes of two of said voltages which are not in phase opposition; and
  indicating means for indicating the times at which the ratio of said amplitudes is equal to a ratio known to correspond to a particular phase state of said data.

7. Apparatus as claimed in claim 6 in which at least one of said auxiliary voltages represents an auxiliary function which is different from that represented by said at least one signal voltage, said functions having the same period and a fixed ratio of peak amplitudes, at least one of said auxiliary voltages changing whenever said at least one signal voltage changes.

8. Apparatus as claimed in claim 6 in which said comparing means comprises at least one bridge circuit whose balance condition is determined in accordance with a ratio known to correspond to a particular phase state of said interpolating data.

9. Apparatus as claimed in claim 8 in which each of said bridge circuits comprises a voltage divider across which a pair of set voltages is connected in series.

10. Apparatus as claimed in claim 9 in which each of said voltage dividers comprising ohmic resistances.

11. Apparatus as claimed in claim 10 in which each of said voltage dividers is a potentiometer.

12. Apparatus as claimed in claim 8 in which the balanced state of each of said bridge circuits is separately detected to indicate the times at which said data is in a corresponding phase state.

13. Apparatus as claimed in claim 8 in which there is provided a flip-flop corresponding to each of said phase states of said data which is detected by one of said bridge circuits, and in which the outputs of said flip-flops are interconnected with each other and to a display device in such a way that such display device will indicate at any one time only the phase state which said data most closely occupies.

14. Apparatus as claimed in claim 8 including means for permitting the zeroing of said display device independently of the instantaneous state of said data.

15. The method of interpolating between the salient features of a data manifestation period, said salient features being in the form of at least one voltage representing an independent variable comprising the steps of:
  (a) generating of said periodic signal voltage, (b) producing at least one auxiliary voltage of at least one polarity, said auxiliary voltage having the same period as said signal voltage and the amplitude constant in proportion to the amplitude of said signal voltage;

(c) shifting said at least one auxiliary voltage of said at least one polarity with respect to said signal voltage;

(d) comparing said at least one signal voltage of at least one polarity with said shifted at least one auxiliary voltage, (e) indicating at time at which the ratio of said signal voltage and said auxiliary voltage is equal to a selected voltage, said time corresponding to a particular phase of said data manifestation period representing a point between said salient features.

16. The method for interpolating between the salient features of a data manifestation period as claimed in claim 15, said at least one auxiliary voltage of step (b) being a plurality of voltages of both polarities, each of said voltages having the same period as said signal voltage;

said step (c) of shifting each of said auxiliary voltage including shifting said auxiliary voltages with respect to said signal voltage and with respect to each successive auxiliary voltage for a constant phase increment, whereby the sum of the separate phase shift increments is equal to a half multiple of the period of said signal voltage, said step (d) of comparing including comparing each of said auxiliary voltages with one polarity of said signal voltage, said step (e) of indicating a time including indication of a plurality of times at which the ratio of said signal voltage and one of the plurality of said auxiliary voltages is equal to a selected voltage, each of said times corresponding to a particular phase of said data period, representing the interpolated point between said salient features.

17. A method of interpolating between the salient features of a data manifestation period as claimed in claim 15, said step (a) of generating further including the step of generating a first and a second signal voltage, said second voltage effectively offset by ¼ period from said first signal voltage, said first voltage representing said data to be interpolated, whereby a course counting in the forward backward directions with respect to a selected reference point within said data manifestation period is accomplished.

18. A method of interpolating between the salient features of a data manifestation period as claimed in claim 15, said step (e) of indicating including the step of combining the outputs of said step of indicating to produce a waveform resembling the integral multiple of said signal voltage.

19. An apparatus for interpolation between the salient features of data manifestation period in the form of at least one periodic signal voltage representing an independent variable comprising;

a transducing means for converting said data into said signal voltage of at least one polarity;

an auxiliary voltage generating means for producing a plurality of auxiliary voltage sources of at least one polarity, each of said auxiliary voltages having the same period as said voltage signal shifted for a different phase with respect to said signal voltage;

a plurality of comparing means for comparing said signal voltage of said at least one polarity with each one of said auxiliary voltages;

a plurality of indicating means for indicating the plurality of times at which the output voltages of said comparing means are equal to at least one selected predetermined voltage, each time of said plurality of times corresponding to a particular phase of said data manifestation period representing the interpolating point between said salient features.

20. An apparatus as in claim 19, said transducing means comprising an inverting means providing at least one source each of a positive and a negative polarity of said signal voltage;

said auxiliary voltage generating means comprising an inverting means providing at least one source each of a positive and a negative polarity of said auxiliary voltage;

said comparing means comprising a bridge, said bridge having a first and a second resistor connected into a first and a second arm of said bridge; one of said positive and negative signal voltage sources connected into a third arm of said bridge and one of said positive and negative auxiliary voltage sources connected into a fourth arm of said bridge, said indicating means connected between a common joint of the third and fourth arms and a common joint of the first and second arms of said bridge;

said indicating means comprising a switching means controlled by a predetermined voltage value between said common joints.

21. An apparatus as in claim 19, said signal voltage comprising a first signal voltage and a second signal voltage, said first and second voltages being offset by about ¼ of said data manifestation period represented by two adjacent salient features.

22. An apparatus as in claim 19, further comprising a switching means, connected between said comparing means and said indicating means to enable a cyclical exchange of the interconnections between each of said plurality of said comparing means and said indicating means.

References Cited

UNITED STATES PATENTS

| | | | |
|---|---|---|---|
| 3,183,360 | 5/1965 | Van Santen | 328—148 |
| 3,221,324 | 11/1965 | Margopoulos | 340—347 |
| 3,234,361 | 2/1966 | McLaren et al. | 340—347 |
| 3,242,479 | 3/1966 | Euler | 340—347 |
| 3,284,794 | 11/1966 | Bean | 340—347 |
| 3,295,061 | 12/1966 | O'Hare | 324—140 |
| 3,297,949 | 1/1967 | Doubek et al. | 324—140 |

MAYNARD R. WILBUR, Primary Examiner

J. GLASSMAN, Assistant Examiner

U.S. Cl. X.R.

324—98, 140